United States Patent
Sapp

(10) Patent No.: US 8,294,610 B2
(45) Date of Patent: Oct. 23, 2012

(54) SYSTEMS AND METHODS FOR RESOLVING INTERFEROMETRIC ANGLE-OF-ARRIVAL AMBIGUITIES DUE TO LOCAL MULTIPATH REFLECTIONS

(75) Inventor: Michael D. Sapp, Garland, TX (US)

(73) Assignee: L-3 Communications Integrated Systems L.P., Greenville, TX (US)

( * ) Notice: Subject to any disclaimer, the term of this patent is extended or adjusted under 35 U.S.C. 154(b) by 372 days.

(21) Appl. No.: 12/799,395

(22) Filed: Apr. 22, 2010

(65) Prior Publication Data

US 2011/0260911 A1  Oct. 27, 2011

(51) Int. Cl.
*G01S 3/00* (2006.01)
(52) U.S. Cl. ........................................ 342/156; 342/159
(58) Field of Classification Search .................. 342/156
See application file for complete search history.

(56) References Cited

U.S. PATENT DOCUMENTS

| | | |
|---|---|---|
| 4,766,444 A | 8/1988 | Conroy et al. |
| 5,568,394 A | 10/1996 | Krikorian et al. |
| 5,583,517 A | 12/1996 | Yokev et al. |
| 5,657,027 A | 8/1997 | Guymon, II |
| 6,525,685 B1 | 2/2003 | Rose |
| 7,358,891 B2 | 4/2008 | Struckman et al. |
| 7,436,351 B2 | 10/2008 | Struckman et al. |
| 7,453,400 B2 | 11/2008 | Struckman et al. |
| 7,961,147 B1 * | 6/2011 | VanLaningham et al. .... 342/424 |
| 2008/0158058 A1 | 7/2008 | Struckman et al. |
| 2011/0205123 A1 * | 8/2011 | Slastion ....................... 342/442 |
| 2011/0208481 A1 * | 8/2011 | Slastion ....................... 702/189 |

OTHER PUBLICATIONS

Wikipedia, "Angle of Arrival", Printed from Internet Nov. 9, 2009, 2 pgs.
Kendall, "Unambiguous Accuracy of an Interferometer Angle-Measuring System", IEEE Transactions on Space Electronics and Telemetry, vol. Set 11, No. 2, Jun. 1965, 9 pgs.
Jacobs et al., "Ambiguity Resolution in Interferometry, IEEE Transactions on Aerospace and Electronic Systems", vol. AES-17, No. 6, Nov. 1981, 15 pgs.

* cited by examiner

*Primary Examiner* — Timothy A Brainard
(74) *Attorney, Agent, or Firm* — O'Keefe, Egan, Peterman & Enders LLP

(57) ABSTRACT

Interferometric angle-of-arrival (AOA) ambiguities due to local multipath reflections are resolved by measuring the received phase differences of one or more pairs of antenna elements of the interferometer array, constructing hypotheses from unwrapped phase pairs that correspond to potential AOA solutions, and selecting the hypothesis that most likely represents the true AOA of the signal emitter based on processed unwrapped data that has been corrected through the application of a priori calibration terms selected on the bases of the candidate hypotheses.

23 Claims, 3 Drawing Sheets

SYSTEMS AND METHODS FOR RESOLVING INTERFEROMETRIC ANGLE-OF-ARRIVAL AMBIGUITIES DUE TO LOCAL MULTIPATH REFLECTIONS

FIELD OF THE INVENTION

This invention relates generally to signal processing, and more particularly to interferometers.

BACKGROUND OF THE INVENTION

Angle of Arrival ("AOA") is a technique employed to determine the propagation direction of a radio-frequency ("RF") signal wave incident on a multi-element antenna array by measuring the Time Difference of Arrival ("TDOA") of the signal at individual elements of the array. This TDOA measurement is made by measuring the difference in received phase at each element in the antenna array, and converting the measured difference to an AOA measurement. AOA technology is used for locating signal emitters such as cell phones or military transmitters, for example, to cue other precision tracking systems such as a search and track radar.

AOA measurements are typically made by measuring the phase difference of a received emitter signal between pairs of antennas in an interferometer array. Interferometer arrays are often mounted on vehicles such as ships or aircraft, and multiple arrays may be employed, e.g., to measure both elevation and azimuth angles. A significant source of AOA error can arise from interferometer ambiguities due to large systemic biases created under multipath conditions when two or more correlated signals are received simultaneously by an interferometer array. A local multipath condition such as a reflection from an aircraft wing, ship structure or from the ocean surface can significantly alter the measured phase perceived by a vehicle-mounted interferometer array (e.g., such as a pod-mounted aircraft interferometer array). In essence, the interferometer array will measure the vector sum of the direct path and the reflected path. The reflected contribution represents an aberration to the interferometer phase measurements that may ultimately make a large portion of the field of view unusable due to AOA ambiguity failures.

The application of AOA calibration terms generally requires unambiguous knowledge of the approximate origin of a signal in direction of arrival within the field of view so that the proper correction can be applied. Therefore, AOA ambiguities become problematic in the identification of proper calibration terms under multipath conditions since estimates made under these circumstances point to inappropriate correction terms.

SUMMARY OF THE INVENTION

Disclosed herein are systems and methods that may be implemented to allow the resolution of interferometric AOA ambiguities by determining the most likely set of calibration terms that can mitigate the systemic bias results that create AOA ambiguities. In this regard, the errant nature of AOA ambiguities may be exploited to ultimately facilitate the resolution of such ambiguities and effectively allow the appropriate application of calibration to mitigate the undesirable effects of multipath induced AOA errors. Advantageously, the disclosed systems and methods may be implemented in one exemplary embodiment to reclaim sections of an interferometer field of view that are known to be perturbed by multipath reflections. In one exemplary embodiment, the disclosed systems and methods may be implemented to resolve interferometric AOA ambiguities to determine true AOA under multipath conditions by considering phase differences while not considering signal amplitude.

In one embodiment of the disclosed systems and methods, an interferometer array of an interferometer system is used to generate phase differences from reception of an emitter signal between separate antenna elements of the array. Ambiguity vectors are then generated from the interferometric phase differences, and these ambiguity vectors may in some situations be contaminated with multipath bias due to local multipath reflections which result from measurement of the vector sum of the direct (true) path and the reflected path. The ambiguity vectors are phase unwrapped to produce multiple candidate unwrapped ambiguity vector hypotheses, only one of which corresponds to a true unambiguous AOA of the original emitter signal. An estimate of the processed phase value that directly relates to the AOA estimate corresponding to each of the unambiguous (true) and untrue unwrapped ambiguity vector hypotheses is then calculated, and calibration or correction values are selected that correspond to each of the AOA values of the respective hypotheses.

Calibration values may be previously collected, for example, by receiving emitter signals of known frequency and at known relative position to the interferometer system, and then generating a calibration database containing calculated true phase difference values for the known emitter versus corresponding measured AOA values under multipath conditions. By doing so, the location of local multipath biases may be determined and factored into the calibration values prior to conducting operations to determine true AOA for a signal emitter of unknown position relative to the interferometer system. A corrected ambiguity vector is then calculated using the selected calibration values for each respective hypothesis, and the smallest vector norm of the corrected ambiguity vectors is selected to identify the corrected processed phase value corresponding to the best estimate of the true AOA. This estimate is then calculated from the respective selected processed phase value.

In one respect, disclosed herein is a method for resolving interferometric angle-of-arrival (AOA) ambiguities due to local multipath reflections, including: receiving a direct path emitter signal at an interferometer array of an interferometer system platform, the emitter signal having an unknown position and a true AOA relative to the interferometer system platform that is unknown; receiving one or more local multipath reflections of the signal emitter together with the direct path emitter signal at the interferometer array, the local multipath reflections being reflections of the received direct path emitter signal caused by one or more physical characteristics of the interferometer system platform; measuring the received phase differences of the received direct path and multipath emitter signals between one or more pairs of antenna elements of the interferometer array due to the combination of the AOA of the direct path emitter signal and the local multipath reflections thereof; and selecting the true AOA of the signal emitter based on the measured phase differences or processed data generated therefrom and based on previously defined a priori information generated from measured reception of emitter signals received at the interferometer array of the interferometer system platform from a signal emitter emitting at one or more known positions relative to the interferometer system platform.

In another respect, disclosed herein is an interferometer system platform, including: an interferometer array including two or more antenna elements configured to receive a direct path emitter signal and local multipath reflections thereof, the local multipath reflections being created by a configuration of one or more physical characteristics of the interferometer system platform; receiver circuitry coupled to each of the antenna elements and configured to receive an analog combination of the direct path emitter signal and the local multipath reflections thereof, the receiver circuitry being configured to convert the analog combination of emitter signals to digital emitter signals; and signal processing circuitry coupled to receive the digital emitter signals from the receiver circuitry. The signal processing circuitry may be configured to: measure the received phase differences of the received direct path and multipath emitter signals between one or more pairs of the antenna elements of the interferometer array due to the combination of the AOA of the direct path emitter signal and the local multipath reflections thereof, and select the true AOA of the signal emitter based on the measured phase differences or processed data generated therefrom and based on previously defined a priori information generated from measured reception of emitter signals received at the interferometer array of the interferometer system platform from a signal emitter emitting at one or more known positions relative to the interferometer system platform.

In another respect, disclosed herein is signal processing circuitry configured for coupling to receive digital emitter signals derived from a direct path emitter signal received together with local multipath reflections thereof at two or more antenna elements of an interferometer array of an interferometer system platform. The signal processing circuitry may include one or more processing devices configured to execute instructions embodied in a non-transitory tangible computer readable medium to perform at least a portion of the following steps: measure the received phase differences of the received direct path and multipath emitter signals between one or more pairs of the antenna elements of the interferometer array due to the combination of the AOA of the direct path emitter signal and the local multipath reflections thereof, and select the true AOA of the signal emitter based on the measured phase differences or processed data generated therefrom and based on previously defined a priori information generated from measured reception of emitter signals received at the interferometer array of the interferometer system platform from a signal emitter emitting at one or more known positions relative to the interferometer system platform.

DESCRIPTION OF ILLUSTRATIVE EMBODIMENTS

Figure 1:
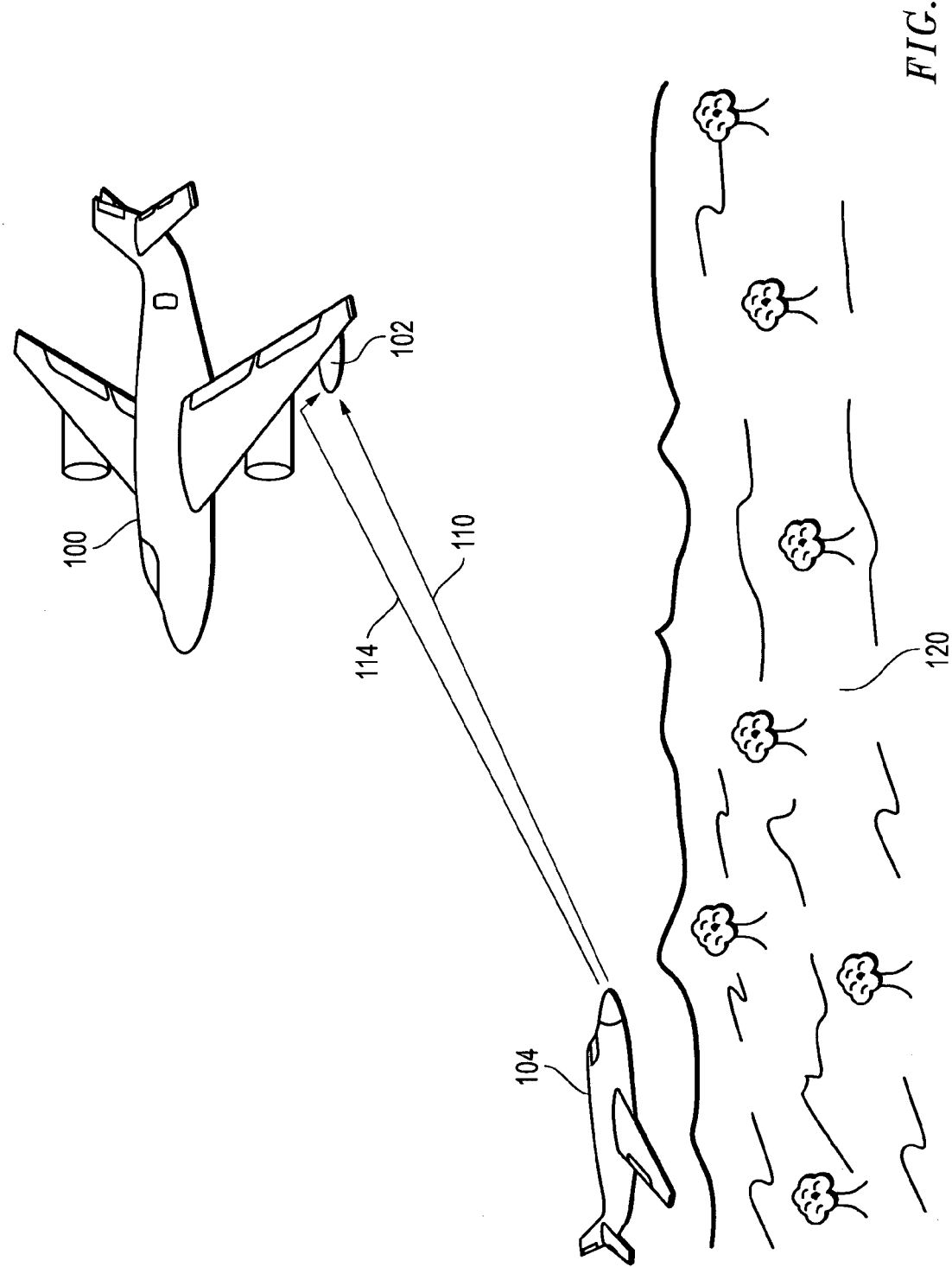
FIG. 1 illustrates an airborne emitter and airborne directional interferometer system platform according to one exemplary embodiment of the disclosed systems and methods.

FIG. 1 illustrates a directional interferometer system platform 100 configured in this embodiment as a fixed wing aircraft. As shown, platform 100 includes a wing-mounted antenna pod 102 in which an interferometer antenna array of an interferometer system is housed. Other signal processing components of the interferometer system may be contained in pod 102, elsewhere on platform 100, and/or at a processing location that is remote from platform 100. The interferometer system uses TDOA to measure the difference in received phase of a radio frequency (RF) signal at each element in the antenna array, and then converts the measured difference to an AOA measurement for emitter 104.

It will be understood that that directional interferometer system platform of FIG. 1 is exemplary only, and that any other type of mobile or vehicle-borne or stationary platform may be employed to support a directional interferometer system, e.g., vehicle-borne platforms (such as ship, helicopter, truck, train, trailer, submarine, space vehicle or satellite, etc.) or stationary platforms (such as a building, tower, etc.). Furthermore, the disclosed systems and methods may be implemented for AOA measurement of other types of signal emitters, e.g., space-based, ocean-based, stationary and/or ground based emitters. Specific examples of emitters include, but are not limited to, cell phones, military transmitters, aircraft, missiles, spacecraft, etc. The disclosed systems and methods may also be used to provide an AOA estimate to cue other precision tracking systems such as a search and track radar.

In the illustrated embodiment of FIG. 1, platform 100 is shown airborne over the surface 120 of the earth. An airborne signal emitter 104 in the form of another fixed wing aircraft is shown travelling within signal range of platform 100. Emitter 104 is emitting a direct path RF signal 110 as shown that is received by an interferometer array in pod 102 together with a multipath reflection signal 114. In this case, local multipath reflection 114 is reflected from emitter 104 off an aircraft wing of platform 100 to pod 102. This results in a local or same-ship multipath condition that requires further compensation by the interferometer system to prevent alteration of the perceived measured phase. Such local multipath reflections may also be produced by reflections off other physical characteristics of an interferometer system platform 100 (e.g., engine nacelles, control surfaces, instrument pods, etc. of an aircraft). Physical characteristics of other types of vehicles or interferometer system platforms are also subject to potential multipath reflection problems. For example, multipath reflections may be produced by signal reflections off deck-mounted equipment or other structure of a ship-based interferometer system platform, etc.

Figure 2:
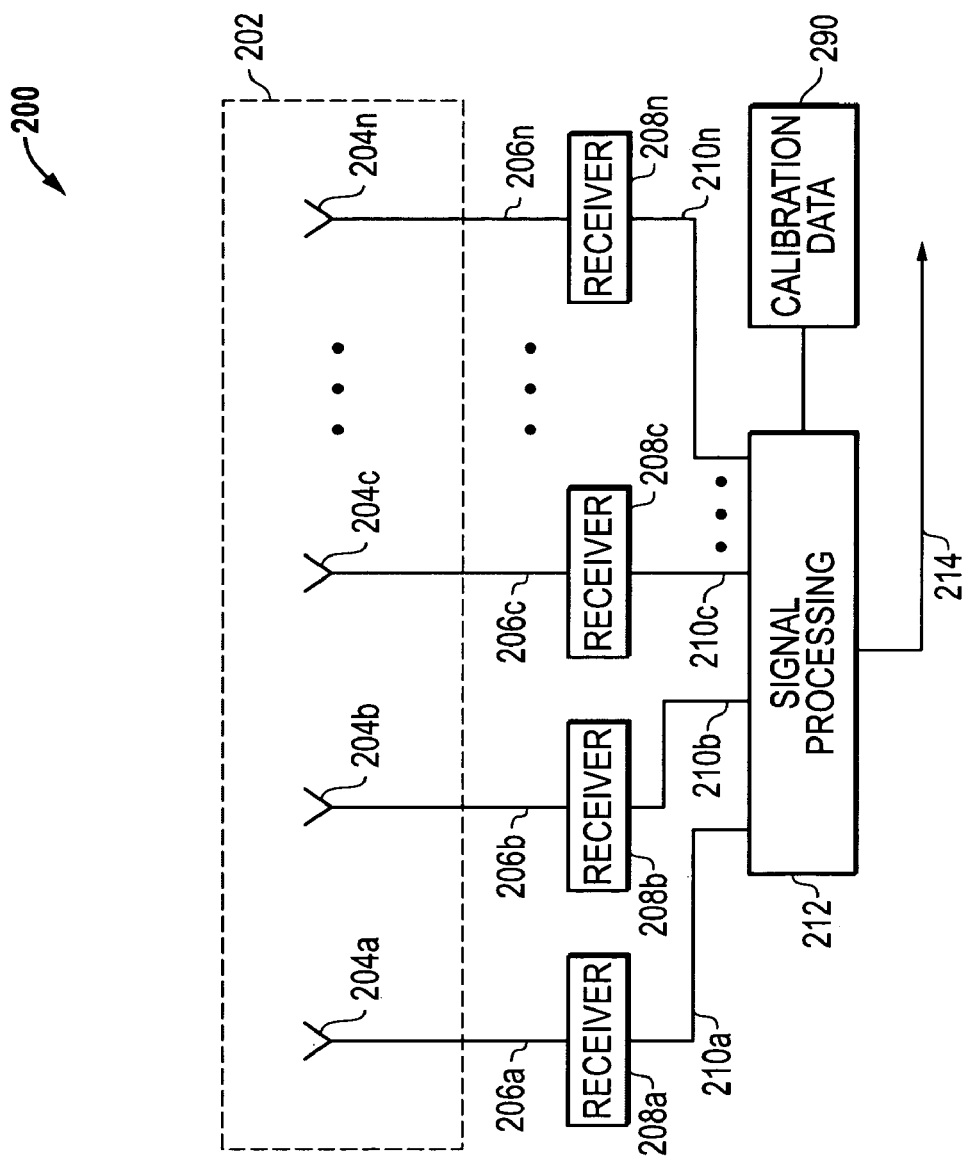
FIG. 2 is a block diagram of a directional interferometer system according to one exemplary embodiment of the disclosed systems and methods.

FIG. 2 is a block diagram of an interferometer system 200, such as may be at least partially contained on platform 100. As shown, interferometer system 200 includes an interferometer array 202 that includes multiple spaced antenna elements 204a to 204n. In this regard, it will be understood that an interferometer array 202 may include two or more antenna elements 204 suitably spaced to allow measurement of the difference in received phase of RF emitter signal 110 at each element 204 in the antenna array in a manner that allows further processing to convert the measured difference to an estimated true AOA measurement 214 as will be described further herein. Interferometer array 202 may have a longitudinal axis that is aligned at any desired angle to the horizon, e.g., azimuth, elevation, etc.

Still referring to FIG. 2, each of antenna elements 204a to 204n is coupled as shown to provide a respective received analog emitter signal 206a to 206n to respective receiver circuitries 208a to 208n. Each of receiver circuitries 208a to 208n convert analog signals 206a to 206n to received digital emitter signals 210a to 210n, which are provided to signal processing circuitry 212 which may be, for example, a digital signal processor (DSP), although any other type of one or more suitable processing device/s (e.g., controller, microcontroller, processor, microprocessor, FPGA, ASIC, etc.) with any suitable configuration of hardware, software, or firmware may be employed. Signal processing circuitry 212 in turn processes digital emitter signals 210a to 210n to perform the steps further described herein in relation to FIG. 3, i.e., ambiguity vector generation, generation of unwrapped ambiguity vector hypotheses, processed phase computation, calibration terms computation, calculation of corrected ambiguity vectors, and generation of an AOA estimate 214.

As shown in FIG. 2, signal processing circuitry 212 is coupled to access calibration database 290 which may be stored, for example, on any suitable memory device such as optical or magnetic disc drive, non-volatile memory (e.g., EPROM, EEPROM, Flash memory, etc.). Calibration database 290 reflects or otherwise contains a priori information gathered, for example, during a previous characterization of the systemic biases under known collection conditions (e.g., flight test results of interferometer system platform 100 at known emitter positions and frequencies). Thus calibration database 290 may include calibration values generated from signals received by interferometer system 200 from a signal emitter of known frequency and which is emitting at known relative position/s to interferometer system 200 as it is presently physically configured and deployed on an interferometer system platform, such as platform 100 of FIG. 1. Such a previous characterization may be performed in one exemplary embodiment to generate a calibration table that contains true values of phase difference corresponding to measured values from a known emitter whose signal is received in combination with local multipath reflections.

Data for database 290 may be collected, for example, by positioning a signal emitter of known frequency at multiple known relative positions and AOA to an interferometer system (e.g., interferometer system platform 100 of FIG. 1), and generating a calibration database 290 containing true interferometer array phase difference values corresponding to the true AOA value of the known emitter (e.g., calculated using the known position and orientation of the interferometer system platform 100 relative to the known emitter) versus the measured values of AOA (i.e., that results from reception at the interferometer array of the combined emitter signal and multipath reflections thereof). However, a calibration database 290 may contain any a priori information that represents a correlation between true signal emitter AOA and the resulting measured phase difference data (or data generated therefrom) that occurs under actual local multipath conditions when the emitter signal having that true AOA is received at the interferometer system platform 100.

In one embodiment, a priori information of calibration database 290 may be of any suitable form that serves to define a correlation between true emitter signal AOA and/or true phase difference values thereof (i.e., known by definition since the emitter location is known during the system characterization operation), and the measured phase difference information and/or calculated AOA values that result from receipt of the direct path emitter signal in combination with the local multipath reflections thereof that occur due to particular physical configuration characteristics of the interferometer system 100. During later receipt of a signal at interferometer array 202 from a signal emitter of unknown position relative to interferometer system 100, calibration values may be selected (e.g., by signal processing circuitry 212) from the calibration database 390 that correspond to the measured phase difference data (or to processed data based thereon) to identify the true AOA of the signal emitter of unknown position.

It will be understood that the particular number and combination of components of interferometer system 200 are exemplary only, and that other combinations of components may be employed, including additional or fewer components. In this regard, the components and functionalities of interferometer system 200 may be combined or segregated into additional components, e.g., individual receiver circuitries 208 may be combined into fewer receiver components and/or functionality of signal processing circuitry 212 and/or calibration database 290 may be divided into two or more components.

Figure 3:
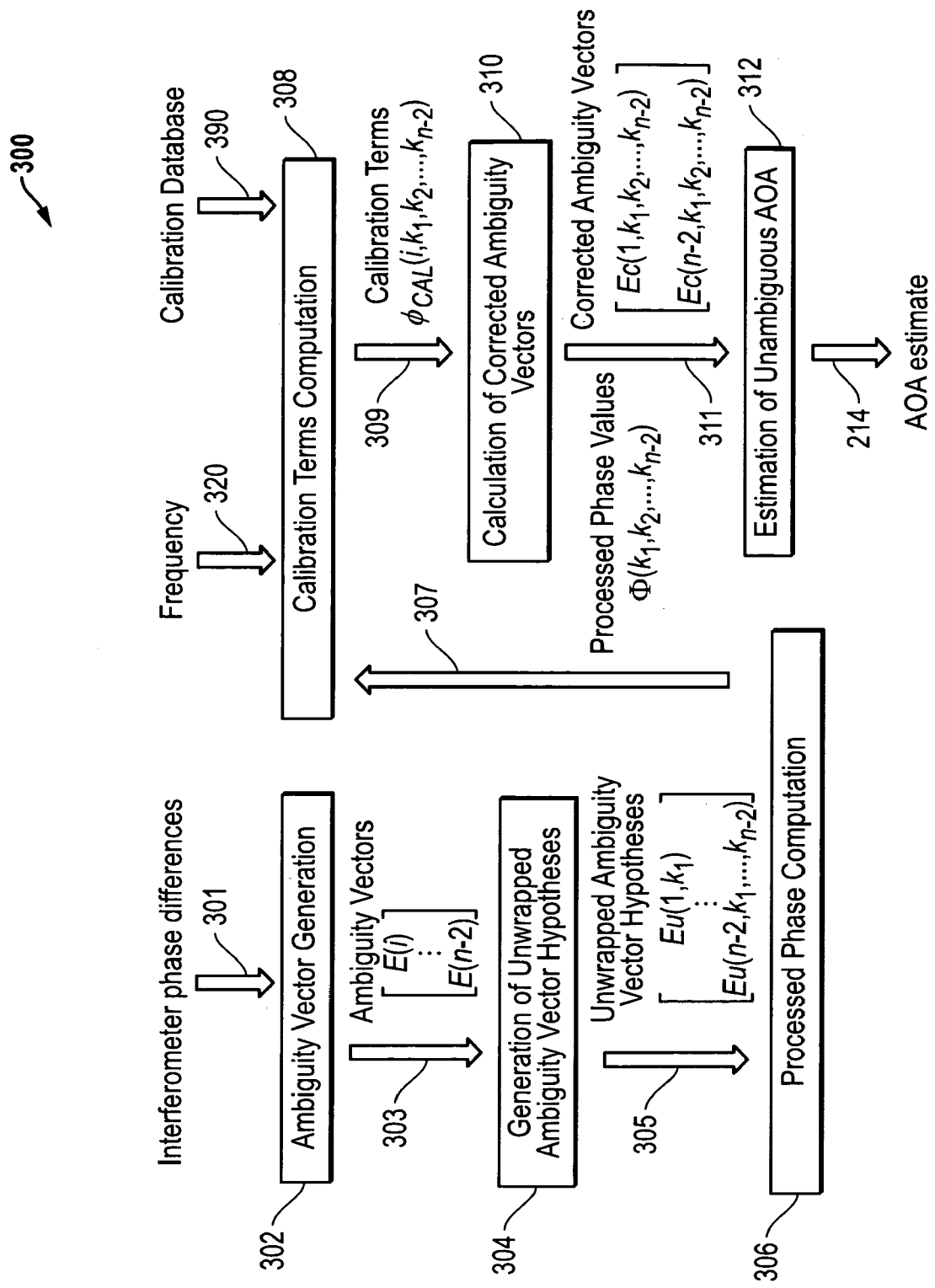
FIG. 3 illustrates methodology for processing digital emitter signals according to one exemplary embodiment of the disclosed systems and methods.

FIG. 3 illustrates one embodiment of methodology 300 that may be employed to process received digital emitter signals 210a to 210n of FIG. 2. In this regard, methodology 300 may be implemented as functional blocks of signal processing circuitry 212 of FIG. 2 to resolve AOA ambiguities caused by reception of multipath signals. As shown in FIG. 3, ambiguity vector generation processing block 302 receives difference phases 301 which have been measured (e.g., by signal processing circuitry 212) for received digital emitter signals 210a to 210n from interferometer array 202 and generates ambiguity vectors 303 that correspond to corresponding to different estimated AOA locations. Phase differences between pairs of the antenna elements 204 may be determined by measuring the TDOA of the signal (including direct path and correlated multipath reflections) between the individual elements 204 of the array 202. Further information on AOA calculation from interferometer phase differences may be found, for example, in William B. Kendall, "Unambiguous Accuracy of an Interferometer Angle-Measuring System", IEEE Transactions on Space Electronics and Telemetry, Vol. SET-11, No. 2, June 1965, pp. 62-70; and in Ernest Jacobs and Elizabeth W. Ralston, "Ambiguity Resolution in Interferometry", IEEE Transactions on Aerospace and Electronics Systems, Vol. AES-17, No. 6, November 1981, pp. 766-780, each of which is incorporated herein by reference in its entirety.

As shown in FIG. 3, the output of ambiguity vector generation processing block 302 is the generated ambiguity vectors 303. These ambiguity vectors reflect pre-defined relationships between the phase measurements. In the illustrated embodiment, the received phase differences information have corrupted phase terms due to multipath reflections (e.g., such as illustrated and described in relation to FIG. 1), and therefore the ambiguity vectors 302 generated by ambiguity vector generation block 302 include corrupted or false AOA data. It is possible to compute an unambiguous AOA estimate through the application of interferometer equations at this point whenever the phase variance is sufficiently low and systemic biases are small. However, large systemic biases due to multipath contributions may force the output to be ambiguous. Advantageously, using the disclosed systems and methods, adjustments may be made to the AOA computation to mitigate an ambiguous result.

As an example, let us represent the set of ambiguity vectors, E(i), through the following equations:

$$E(i)=e_i(\phi(1),\phi(2),\ldots,\phi(n-1),E(1),E(2),\ldots,E(i-1))$$

$$E^T=[E(1)E(2)\ldots E(n-2)]$$

where:

$e_i(\ )$ is the normally defined ambiguity function,
$E^T$ is the vector of ambiguity values,
n is the number of antennas,
i is an index value that identifies individual ambiguity functions, and
$\phi$ is the phase difference measured between antennas.

Under multipath conditions the output 303 of ambiguity vector generation processing block 302 can be a set of ambiguity vectors corresponding to vastly different estimated AOA locations for a single source signal emitter 104 whenever ambiguities occur. This dispersion of AOA estimates spanning a large portion of the field of view may generally be attributed to the phase distortion that results under multipath conditions. Whenever detection is possible, the phase distortion manifests itself within the differential phase as systemic biases. Under these ambiguous situations the AOA estimates may have no resemblance to the true AOA. Therefore, further processing is required to resolve potential ambiguities, and the computed ambiguity vectors 303 are provided in this exemplary embodiment to an unwrapped ambiguity vector hypothesis generation processing block 304.

In processing block 304, the initial ambiguity vectors are essentially phase unwrapped (e.g., from modulo-2pi phase) to produce hypotheses 305 of multiple candidate ambiguity vectors populating potential AOAs, each of which may correspond to the true unambiguous result. The construction of the unwrapped ambiguity vector hypotheses, Eu(i, $k_i$), can be represented by:

$$Eu(k_1,k_2,\ldots,k_{n-2})^T = [Eu(1,k_1)Eu(2,k_1,k_2)\ldots Eu(n-2,k_1,\ldots,k_{n-2})]$$

where
k is an index value that provides the selection of $2\pi$ multiples necessary for the construction of the hypotheses $$Eu(i,k_1,\ldots,k_i) = E(i,k_1,\ldots,k_{i-1}) + (k_i-1)*2\pi$$

$$E(i,k_1,\ldots,k_{i-1}) = e_i(\phi(1),\phi(2),\ldots,\phi(n-1),Eu(1,k_1),\ldots Eu(i-1,k_1,\ldots k_{i-1}))$$

and $$0 \leq k_i \leq 2$$

$$1 \leq i \leq n-2$$

At this point of processing, the knowledge of which ambiguity vector hypothesis 305 more closely corresponds to vectors representing the true AOA is unknown, therefore the unwrapped ambiguity vector hypotheses 305 are provided to processed phase computation processing block 306 which computes an estimate 307 of the processed phase value, $\Phi(k_1, k_2\ldots,k_{n-2})$, for each of the unambiguous (true) and untrue unwrapped ambiguity vector hypotheses 305 so that subsequent corrections may be made for each of the unwrapped ambiguity vector hypotheses 305. These processed phase values 307 are intermediate steps in the estimation of the hypothesis AOA and can be represented in one exemplary embodiment as:

$$\Phi(k_1,k_2,\ldots,k_{n-2}) = phia(\phi(1),\phi(2),\ldots,\phi(n-1),Eu(k_1,k_2,\ldots,k_{n-2}))$$

for all combinations of $k_i$ with $0 \leq k_i \leq 2$
where
phia( ) is the normally defined processed phase function,
$\phi$( ) is the averaged phase pair difference, and $Eu(k_1, k_2,\ldots,k_{n-2})$ is unwrapped ambiguity vector.

Since the processed phase 307 is directly related to the AOA estimate, it is used in one embodiment as a parameter in the determination of which prospective calibration correction terms may be used to adjust the AOA estimate to correct for the multipath error. Correction or calibration values 309, $\phi_{CAL}(i, k_1, k_2, \ldots, k_{n-2})$, are selected in calibration terms computation processing block 308 from calibration database 390 (e.g., pre-defined calibration table) according to indices specified by processed phase values 307, $\Phi(k_1, k_2, \ldots, k_{n-2})$, and known frequency 320 of received analog emitter signals 206a to 206n which are collected by interferometer array 202. In one exemplary embodiment, the calibration terms may be resident in a calibration database 390 that is provided as a lookup calibration table that addresses the full range of the processed phase values as the independent variable. The corresponding calibration terms may then be selected based on the nearest index indicated by the processed phase value.

In calibration terms computation processing block 308, a particular set of calibration values 309 is selected that corresponds to each of the unwrapped ambiguity vector hypotheses 305. However, only one set of calibration values 309 represents the true AOA and its correction. Since only one set of calibration values 309 generated in calibration terms computation processing block 308 corresponds to the true AOA hypothesis, the task of determining which hypothesis best predicts the true AOA remains to be solved in following processing blocks of FIG. 3. Specifically, once the correction terms have been selected for each hypothesis in calibration terms computation processing block 308, sufficient information is available to adjust each of the unwrapped ambiguity vector hypotheses 305 accordingly. This is accomplished by adjusting the individual interferometer phases in the calculation of corrected ambiguity vectors processing block 310 to compute a set of corrected ambiguity vector values 311, Ec(i, $k_1, k_2, \ldots, k_{n-2}$), for each of the hypotheses 305. These values 311 are essentially a function of the original input phase values 301 corrected through the application of calibration terms 309 which have been selected on the basis of the generated hypotheses 305. These corrected ambiguity vectors 311 may be represented as follows:

$$Ec(i,k_1,k_2,\ldots,k_{n-2}) = e_i(\phi(1)+\phi_{CAL}(1,k_1,k_2,\ldots,k_{n-2}),\ldots,\phi(n-1)+\phi_{CAL}(n,k_1,k_2,\ldots,k_{n-2}),Ec(1,k_1,k_2,\ldots,k_{n-2})),\ldots Ec(i-1,k_1,k_2,\ldots,k_{n-2}))$$

where
$e_i$( ) is the normally defined ambiguity function
and $$Ec(k_1,k_2,\ldots,k_{n-2})^T = [Ec(1,k_1,k_2,\ldots,k_{n-2})\ldots Ec(n-2,k_1,k_2,\ldots,k_{n-2})]$$

Still referring to FIG. 3, the selection of the most likely hypothesis 305 is now performed in estimation of unambiguous AOA processing block 312 of FIG. 3. In particular, processing block 312 may be implemented to produce the estimate of which corrected process phase value 307, $\Phi_c(k_{1min}, k_{2min}\ldots,k_{n-2min})$ corresponds to best estimate 214 of the true AOA. The determination may be based on the smallest vector norm of the resulting corrected ambiguity vectors 311 produced in corrected ambiguity vectors processing block 310 for all combinations of unwrapped phase. Thus, in one embodiment, estimation of unambiguous AOA processing block 312 determines the values of $k_1$ that correspond to the smallest vector norm. The determination is represented as:

$$\min\{Ec(k_1,k_2,\ldots,k_{n-2})^T Ec(k_1,k_2,\ldots,k_{n-2})\} => k_{1min}, k_{2min},\ldots,k_{n-2min}$$

Therefore the best estimate of the processed phase 307, and ultimately the true AOA, is determined through the following calculation:

$$\Phi_c(k_{1min},k_{2min},\ldots,k_{n-2min}) = phia(\phi(1)+\phi_{CAL}(1,k_{1min}, k_{2min},\ldots,k_{n-2min}),\ldots,\phi(n-1)+\phi_{CAL}(n-1,k_{1min}, k_{2min},\ldots,k_{n-2min}), Ec(1,k_{1min},k_{2min}\ldots,k_{n-2min}),\ldots Ec(n-2,k_{1min},k_{2min}\ldots,k_{n-2min}))$$

This results in a mitigation of the ambiguities resulting from the introduction of large systemic errors typical of local multipath environments and allows significant portions of the AOA field of view previously contaminated by multipath to be reclaimed. Processing block 312 thus produces an estimation of an unambiguous AOA for the true estimate 214 as shown in FIG. 3.

It will be understood that one or more of the tasks, functions, or methodologies described herein may be implemented, for example, as firmware or other computer program of instructions embodied in a non-transitory tangible computer readable medium that is executed by a CPU, controller, microcontroller, processor, microprocessor, FPGA, ASIC, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method for resolving interferometric angle-of-arrival (AOA) ambiguities due to local multipath reflections, comprising:
receiving a direct path emitter signal at an interferometer array of an interferometer system platform, the emitter signal having an unknown position and a true AOA relative to the interferometer system platform that is unknown;
receiving one or more local multipath reflections of the signal emitter together with the direct path emitter signal at the interferometer array, the local multipath reflections being reflections of the received direct path emitter signal caused by one or more physical characteristics of the interferometer system platform;
measuring the received phase differences of the received direct path and multipath emitter signals between one or more pairs of antenna elements of the interferometer array due to the combination of the AOA of the direct path emitter signal and the local multipath reflections thereof; and
selecting the true AOA of the signal emitter based on the measured phase differences or processed data generated therefrom and based on previously defined a priori information generated from measured reception of emitter signals received at the interferometer array of the interferometer system platform from a signal emitter emitting at one or more known positions relative to the interferometer system platform.

2. The method of claim 1, further comprising:
processing the measured phase differences to generate processed phase difference data, the identity of the processed phase difference data corresponding to the true AOA of the signal emitter being unknown;
applying selected calibration values to the processed phase difference data to generate corrected phase difference data; and
selecting the true AOA of the signal emitter from the corrected phase difference data;
wherein the calibration information includes calibration values that are each previously generated from signals received from a signal emitter emitting at a known position relative to the interferometer system.

3. The method of claim 1, further comprising:
generating multiple unwrapped ambiguity vector hypotheses from the measured phase differences, an unknown single one of which corresponds to the true AOA of the emitter signal;
computing values representative of an AOA for each of the unwrapped ambiguity vector hypotheses;
selecting a set of calibration values that corresponds to each of the values representative of an AOA, each of the calibration values being previously generated from signals received from a signal emitter emitting at a known relative position to the interferometer system;
computing a set of corrected ambiguity vectors by applying a respective selected set of calibration values to the corresponding one of each of the values representative of an AOA to generate a corresponding corrected ambiguity vector;
selecting the smallest vector norm of the corrected ambiguity vectors to identify the corrected ambiguity vector corresponding to the processed phase value of the true AOA; and
selecting the true AOA as the AOA corresponding to the processed value that corresponds to the selected vector norm.

4. The method of claim 1, further comprising:
generating multiple unwrapped ambiguity vector hypotheses from the measured phase differences, an unknown single one of which corresponds to the true AOA of the emitter signal;
computing values representative of an AOA for each of the unwrapped ambiguity vector hypotheses;
computing a processed phase value for each of the unwrapped ambiguity vector hypotheses
selecting a set of calibration values that corresponds to each of the processed phase values, each of the calibration values being previously generated from signals received from a signal emitter emitting at a known relative position to the interferometer system;
computing a set of corrected ambiguity vectors by applying a respective selected set of calibration values to the corresponding one of each of the processed phase values to generate a corresponding corrected ambiguity vector;
selecting the smallest vector norm of the corrected ambiguity vectors to identify the corrected ambiguity vector corresponding to the processed phase value of the true AOA; and
selecting the true AOA as the AOA corresponding to the processed value that corresponds to the selected vector norm.

5. The method of claim 1, wherein the interferometer system platform comprises an aircraft.

6. The method of claim 1, wherein the interferometer system platform has a given configuration of physical characteristics that creates particular multipath reflections for direct path signals; and wherein the method further comprises generating the a priori information by measuring direct path emitter signals and multipath reflections thereof received at the interferometer array of the interferometer system platform from a signal emitter emitting at one or more known positions relative to the interferometer system platform prior to the steps of receiving the direct path emitter signal and the one or more local multipath reflections thereof from the signal emitter having an unknown position and a true AOA relative to the interferometer system platform that is unknown, the given configuration of physical characteristics of the interferometer system being the same when receiving the emitter signals from the known emitter locations as when receiving the emitter signals from the unknown emitter location.

7. The method of claim 6, further comprising storing the a priori information in a calibration database; and accessing the a priori information in the calibration database prior to the step of selecting the true AOA of the signal emitter from the corrected phase difference data.

8. The method of claim 1, wherein the direct path emitter signal is a radio frequency (RF) signal.

9. An interferometer system platform, comprising:
an interferometer array comprising two or more antenna elements configured to receive a direct path emitter signal and local multipath reflections thereof, the local multipath reflections being created by a configuration of one or more physical characteristics of the interferometer system platform;

receiver circuitry coupled to each of the antenna elements and configured to receive an analog combination of the direct path emitter signal and the local multipath reflections thereof, the receiver circuitry being configured to convert the analog combination of emitter signals to digital emitter signals;

signal processing circuitry coupled to receive the digital emitter signals from the receiver circuitry and configured to:

measure the received phase differences of the received direct path and multipath emitter signals between one or more pairs of the antenna elements of the interferometer array due to the combination of the AOA of the direct path emitter signal and the local multipath reflections thereof, and select the true AOA of the signal emitter based on the measured phase differences or processed data generated therefrom and based on previously defined a priori information generated from measured reception of emitter signals received at the interferometer array of the interferometer system platform from a signal emitter emitting at one or more known positions relative to the interferometer system platform.

10. The system of claim 9, further comprising a calibration database coupled to the signal processing circuitry, the calibration database containing the previously defined a priori information; and wherein in the signal processing circuitry is further configured to:

process the measured phase differences to generate processed phase difference data, the identity of the processed phase difference data corresponding to the true AOA of the signal emitter being unknown;

select calibration values from the calibration database and apply the selected calibration values to the processed phase difference data to generate corrected phase difference data; and select the true AOA of the signal emitter from the corrected phase difference data;

wherein the calibration information includes calibration values that are each previously generated from signals received from a signal emitter emitting at a known position relative to the interferometer system.

11. The system of claim 9, further comprising a calibration database coupled to the signal processing circuitry, the calibration database containing the previously defined a priori information; and wherein in the signal processing circuitry is further configured to:

generate multiple unwrapped ambiguity vector hypotheses from the measured phase differences, an unknown single one of which corresponds to the true AOA of the emitter signal;

compute values representative of an AOA for each of the unwrapped ambiguity vector hypotheses;

select a set of calibration values from the calibration database that corresponds to each of the values representative of an AOA, each of the calibration values being previously generated from signals received from a signal emitter emitting at a known relative position to the interferometer system;

compute a set of corrected ambiguity vectors by applying a respective selected set of calibration values to the corresponding one of each of the values representative of an AOA to generate a corresponding corrected ambiguity vector;

select the smallest vector norm of the corrected ambiguity vectors to identify the corrected ambiguity vector corresponding to the processed phase value of the true AOA; and select the true AOA as the AOA corresponding to the processed value that corresponds to the selected vector norm.

12. The system of claim 9, further comprising a calibration database coupled to the signal processing circuitry, the calibration database containing the previously defined a priori information; and wherein in the signal processing circuitry is further configured to:

generate multiple unwrapped ambiguity vector hypotheses from the measured phase differences, an unknown single one of which corresponds to the true AOA of the emitter signal;

compute values representative of an AOA for each of the unwrapped ambiguity vector hypotheses;

compute a processed phase value for each of the unwrapped ambiguity vector hypotheses select a set of calibration values from the calibration database that corresponds to each of the processed phase values, each of the calibration values being previously generated from signals received from a signal emitter emitting at a known relative position to the interferometer system;

compute a set of corrected ambiguity vectors by applying a respective selected set of calibration values to the corresponding one of each of the processed phase values to generate a corresponding corrected ambiguity vector;

select the smallest vector norm of the corrected ambiguity vectors to identify the corrected ambiguity vector corresponding to the processed phase value of the true AOA; and select the true AOA as the AOA corresponding to the processed value that corresponds to the selected vector norm.

13. The system of claim 9, wherein the interferometer system platform comprises an aircraft.

14. The system of claim 9, further comprising a calibration database coupled to the signal processing circuitry, the calibration database containing the previously defined a priori information; wherein the interferometer system platform has a given configuration of physical characteristics that creates particular multipath reflections for direct path signals; and wherein the a priori information has been previously generated by measuring direct path emitter signals and multipath reflections thereof received at the interferometer array of the interferometer system platform from a signal emitter emitting at one or more known positions relative to the interferometer system platform, the given configuration of physical characteristics of the interferometer system being the same when the emitter signals were received from the known emitter locations to generate the a priori information as the current configuration of physical characteristics of the interferometer system.

15. The system of claim 14, wherein the signal processing circuitry is configured to access the a priori information in the calibration database prior to selecting the true AOA of the signal emitter from the corrected phase difference data.

16. The system of claim 9, wherein the direct path emitter signal is a radio frequency (RF) signal.

17. Signal processing circuitry configured for coupling to receive digital emitter signals derived from a direct path emitter signal received together with local multipath reflections thereof at two or more antenna elements of an interferometer array of an interferometer system platform, the signal processing circuitry comprising:

one or more processing devices configured to execute instructions embodied in a non-transitory tangible computer readable medium to perform at least a portion of the following steps:

measure the received phase differences of the received direct path and multipath emitter signals between one or more pairs of the antenna elements of the interferometer array due to the combination of the AOA of the direct path emitter signal and the local multipath reflections thereof, and select the true AOA of the signal emitter based on the measured phase differences or processed data generated therefrom and based on previously defined a priori information generated from measured reception of emitter signals received at the interferometer array of the interferometer system platform from a signal emitter emitting at one or more known positions relative to the interferometer system platform.

18. The system of claim 17, wherein the signal processing circuitry is further configured for coupling to a calibration database containing the previously defined a priori information; and wherein the one or more processing devices are further configured to execute instructions embodied in a non-transitory tangible computer readable medium to perform at least a portion of the following steps:

process the measured phase differences to generate processed phase difference data, the identity of the processed phase difference data corresponding to the true AOA of the signal emitter being unknown;

select calibration values from the calibration database and apply the selected calibration values to the processed phase difference data to generate corrected phase difference data; and select the true AOA of the signal emitter from the corrected phase difference data;

wherein the calibration information includes calibration values that are each previously generated from signals received from a signal emitter emitting at a known position relative to the interferometer system.

19. The system of claim 17, wherein the signal processing circuitry is further configured for coupling to a calibration database containing the previously defined a priori information; and wherein the one or more processing devices are further configured to execute instructions embodied in a non-transitory tangible computer readable medium to perform at least a portion of the following steps:

generate multiple unwrapped ambiguity vector hypotheses from the measured phase differences, an unknown single one of which corresponds to the true AOA of the emitter signal;

compute values representative of an AOA for each of the unwrapped ambiguity vector hypotheses;

select a set of calibration values from the calibration database that corresponds to each of the values representative of an AOA, each of the calibration values being previously generated from signals received from a signal emitter emitting at a known relative position to the interferometer system;

compute a set of corrected ambiguity vectors by applying a respective selected set of calibration values to the corresponding one of each of the values representative of an AOA to generate a corresponding corrected ambiguity vector;

select the smallest vector norm of the corrected ambiguity vectors to identify the corrected ambiguity vector corresponding to the processed phase value of the true AOA; and select the true AOA as the AOA corresponding to the processed value that corresponds to the selected vector norm.

20. The system of claim 17, wherein the signal processing circuitry is further configured for coupling to a calibration database containing the previously defined a priori information; and wherein the one or more processing devices are further configured to execute instructions embodied in a non-transitory tangible computer readable medium to perform at least a portion of the following steps:

generate multiple unwrapped ambiguity vector hypotheses from the measured phase differences, an unknown single one of which corresponds to the true AOA of the emitter signal;

compute values representative of an AOA for each of the unwrapped ambiguity vector hypotheses;

compute a processed phase value for each of the unwrapped ambiguity vector hypotheses select a set of calibration values from the calibration database that corresponds to each of the processed phase values, each of the calibration values being previously generated from signals received from a signal emitter emitting at a known relative position to the interferometer system;

compute a set of corrected ambiguity vectors by applying a respective selected set of calibration values to the corresponding one of each of the processed phase values to generate a corresponding corrected ambiguity vector;

select the smallest vector norm of the corrected ambiguity vectors to identify the corrected ambiguity vector corresponding to the processed phase value of the true AOA; and select the true AOA as the AOA corresponding to the processed value that corresponds to the selected vector norm.

21. The system of claim 17, wherein the signal processing circuitry is further configured for coupling to a calibration database containing the previously defined a priori information; wherein the interferometer system platform has a given configuration of physical characteristics that creates particular multipath reflections for direct path signals; and wherein the a priori information has been previously generated by measuring direct path emitter signals and multipath reflections thereof received at the interferometer array of the interferometer system platform from a signal emitter emitting at one or more known positions relative to the interferometer system platform, the given configuration of physical characteristics of the interferometer system being the same when the emitter signals were received from the known emitter locations to generate the a priori information as the current configuration of physical characteristics of the interferometer system.

22. The system of claim 21, wherein the one or more processing devices are further configured to access the a priori information in the calibration database prior to selecting the true AOA of the signal emitter from the corrected phase difference data.

23. The system of claim 17, wherein the direct path emitter signal is a radio frequency (RF) signal.

* * * * *